United States Patent
Chaterjee

(10) Patent No.: US 9,501,228 B1
(45) Date of Patent: Nov. 22, 2016

(54) SYSTEM, METHOD, AND COMPUTER PROGRAM FOR FETCHING DATA FROM A PHYSICAL MEMORY QUEUE UTILIZING AN ALIAS QUEUE NAME

(71) Applicant: Amdocs Software Systems Limited, Dublin (IE)

(72) Inventor: Sourav Chaterjee, Champaign, IL (US)

(73) Assignees: Amdoc Software Systems Limited, Dublin (IE); Amdocs Development Limited, Limassol (CY)

( * ) Notice: Subject to any disclaimer, the term of this patent is extended or adjusted under 35 U.S.C. 154(b) by 47 days.

(21) Appl. No.: 14/555,495

(22) Filed: Nov. 26, 2014

(51) Int. Cl.
*G06F 12/00* (2006.01)
*G06F 3/06* (2006.01)
*G06F 12/06* (2006.01)

(52) U.S. Cl.
CPC .......... *G06F 3/0611* (2013.01); *G06F 3/0638* (2013.01); *G06F 3/0673* (2013.01); *G06F 12/06* (2013.01); *G06F 2212/1016* (2013.01); *G06F 2212/1041* (2013.01)

(58) Field of Classification Search
CPC .... G06F 3/0611; G06F 12/06; G06F 3/0673; G06F 3/0638
See application file for complete search history.

(56) References Cited

U.S. PATENT DOCUMENTS

| | | | | |
|---|---|---|---|---|
| 6,029,205 A * | 2/2000 | Alferness | ............... | G06F 9/546 718/103 |
| 6,625,117 B1 * | 9/2003 | Chen | ....................... | H04L 1/22 370/227 |
| 7,127,507 B1 * | 10/2006 | Clark | .................... | H04L 43/045 709/224 |
| 7,155,438 B2 * | 12/2006 | Potter | ..................... | G06F 9/542 |
| 8,141,103 B2 | 3/2012 | Harran et al. | | |
| 2003/0177412 A1 * | 9/2003 | Todd | ................... | G06F 11/0751 714/25 |
| 2005/0125810 A1 * | 6/2005 | Kline | ..................... | G06F 9/546 719/320 |
| 2006/0106941 A1 * | 5/2006 | Singhal | ............... | H04L 67/2823 709/238 |
| 2006/0200808 A1 * | 9/2006 | Kalidindi | .................. | G06F 8/51 717/136 |
| 2009/0260020 A1 * | 10/2009 | Arts | ......................... | G06F 8/30 719/320 |

* cited by examiner

*Primary Examiner* — Larry Mackall
(74) *Attorney, Agent, or Firm* — Zilka-Kotab, PC

(57) ABSTRACT

A system, method, and computer program product are provided for fetching data from a physical memory queue utilizing an alias queue name. In use, a physical queue associated with at least a portion of memory is identified. Additionally, a first alias queue name is mapped to the physical queue. Further, data is fetched utilizing the first alias queue name in response to a request to fetch the data from the physical queue.

18 Claims, 5 Drawing Sheets

SYSTEM, METHOD, AND COMPUTER PROGRAM FOR FETCHING DATA FROM A PHYSICAL MEMORY QUEUE UTILIZING AN ALIAS QUEUE NAME

FIELD OF THE INVENTION

The present invention relates to accessing data from physical queues utilizing logical queue names.

BACKGROUND

There is generally an outage or interruption in service when switching between applications listening, getting, and servicing requests from a particular memory queue. The activation/deactivation process of an application set usually takes a few minutes, thus creating an outage. The activation/deactivation process of an application set is also error prone since it is handled at the client level.

There is thus a need for addressing these and/or other issues associated with the prior art.

SUMMARY

A system, method, and computer program product are provided for fetching data from a physical memory queue utilizing an alias queue name. In use, a physical queue associated with at least a portion of memory is identified. Additionally, a first alias queue name is mapped to the physical queue. Further, data is fetched utilizing the first alias queue name in response to a request to fetch the data from the physical queue.

DETAILED DESCRIPTION

Figure 1:
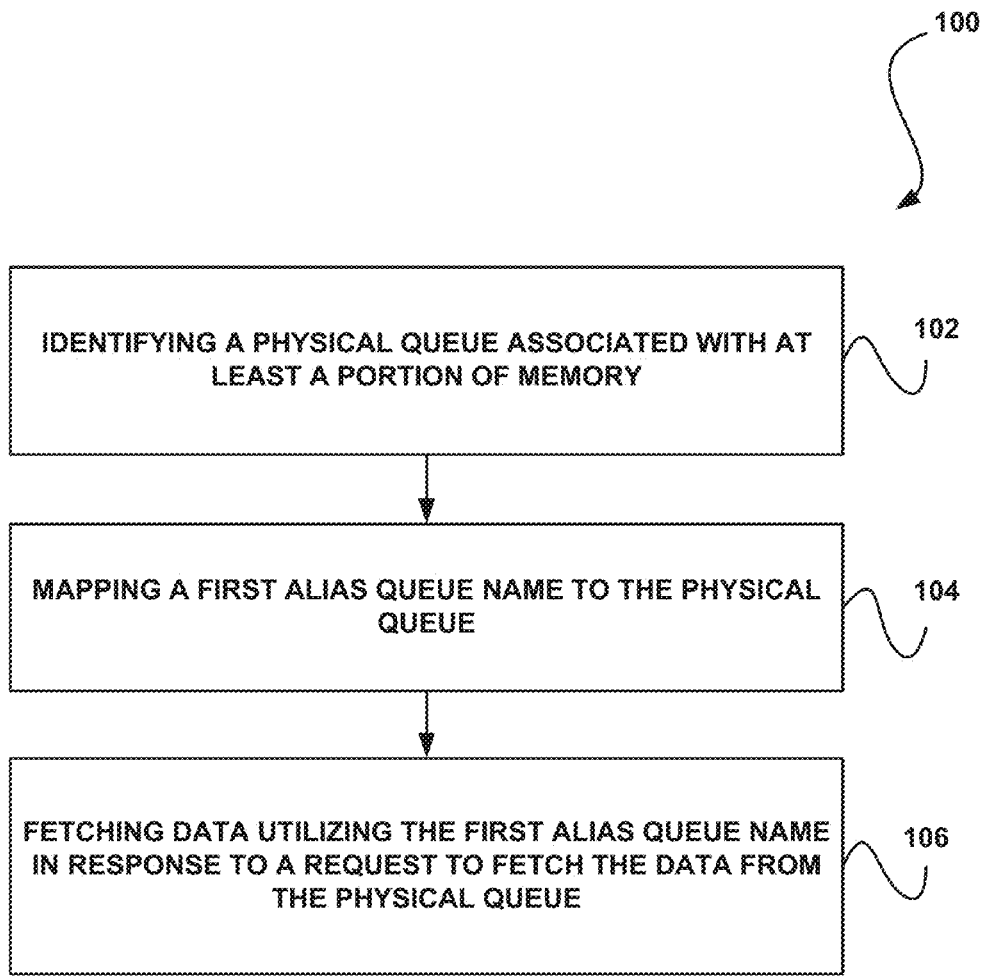
FIG. 1 illustrates a method for fetching data from a physical memory queue utilizing an alias queue name, in accordance with one embodiment.

FIG. 1 illustrates a method 100 for fetching data from a physical memory queue utilizing an alias queue name, in accordance with one embodiment.

As shown, a physical queue associated with at least a portion of memory is identified. See operation 102. The physical queue may include any portion or portions of the memory. Moreover, the memory may include any type of memory. In one embodiment, identifying the physical queue may include allocating a portion or portions of the memory to the physical queue.

Additionally, a first alias queue name is mapped to the physical queue. See operation 104. The first alias queue name may include any logical name and may include any number of characters, symbols, and/or numbers, etc.

Further, data is fetched utilizing the first alias queue name in response to a request to fetch the data from the physical queue. See operation 106. The data may include any data stored in the physical queue. The data may be fetched utilizing a GET operation (e.g. MQGET, etc.).

The first alias queue may be associated with various applications and/or application programming interfaces (APIs). For example, the first alias queue name may be associated with a primary application programming interface.

In one embodiment, the method 100 may further include receiving an indication to utilize a maintenance application programming interface instead of the primary application programming interface. In this case, the maintenance application programming interface may have the same functionality as the primary application programming interface.

Additionally, a second alias queue name may be mapped to the physical queue. The second alias queue name may be associated with the maintenance application programming interface. Moreover, the second alias queue may be different than the first alias queue name.

When it is desired to use the maintenance application programming interface, as opposed to the primary application programming interface (e.g. in response to performing maintenance on the primary API, etc.), the maintenance application programming interface may be utilized without any down time. For example, the first alias queue name may be mapped to a dummy queue and additional data may be fetched utilizing the second alias queue name in response to a request to fetch the additional data from the physical queue. The additional data may be fetched utilizing the second alias queue name without any disruption of service to application usage associated with the APIs.

As another example of a use case, such techniques may be used in the context of usage scaling. For example, the first alias queue name may be associated with a first set of applications.

Further, a plurality of different alias queue names may be mapped to the physical queue. In this case, each of the different alias queue names may associated with a different set of applications (e.g. application set A, application set B, etc.).

Thus, if it is determined to scale up usage associated with the first set of applications (e.g. during a peak usage time, etc.), it may be determined to scale up usage associated with the first set of applications by utilizing the different set of applications. Accordingly, data may be fetched from the physical queue utilizing the plurality of different alias queue names, such that the different set of applications are capable of being utilized without interruption to use of first set of applications (e.g. without any outage, etc.).

Client applications that connect to a message queue may use different alias queues to connect. These may be activated by targeting the alias queue to the real queue, or may be deactivated by targeting the alias queue to a dummy queue, as and when required. The connections shift when custom message queue channels are refreshed and it takes fraction of a second for the connections to shift.

Thus, the method 100 may be implemented such that application clients fetch messages not from the real physical queue but from an alias name mapped to the real queue. Additionally, the method 100 may be utilized to implement a production application maintenance strategy to achieve high availability for applications servicing messages from a queue. This strategy works by switching application sets listening to a particular queue and servicing requests, to a different set of applications with minimal or no outage.

There is generally an outage if a system switches between applications listening, getting, and servicing requests from a particular queue. The activation/deactivation process of an application set usually takes a few minutes, thus creating an outage. This process is also error prone since it is handled at the client level. Utilizing the method 100, dependencies at a client level are completely removed and it is a single channel bounce that triggers the switch. This process ensures that switching between two sets of applications is seamless.

The method 100 may function to implement an effective strategy where aliases, which are logical names, are mapped to actual queues.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
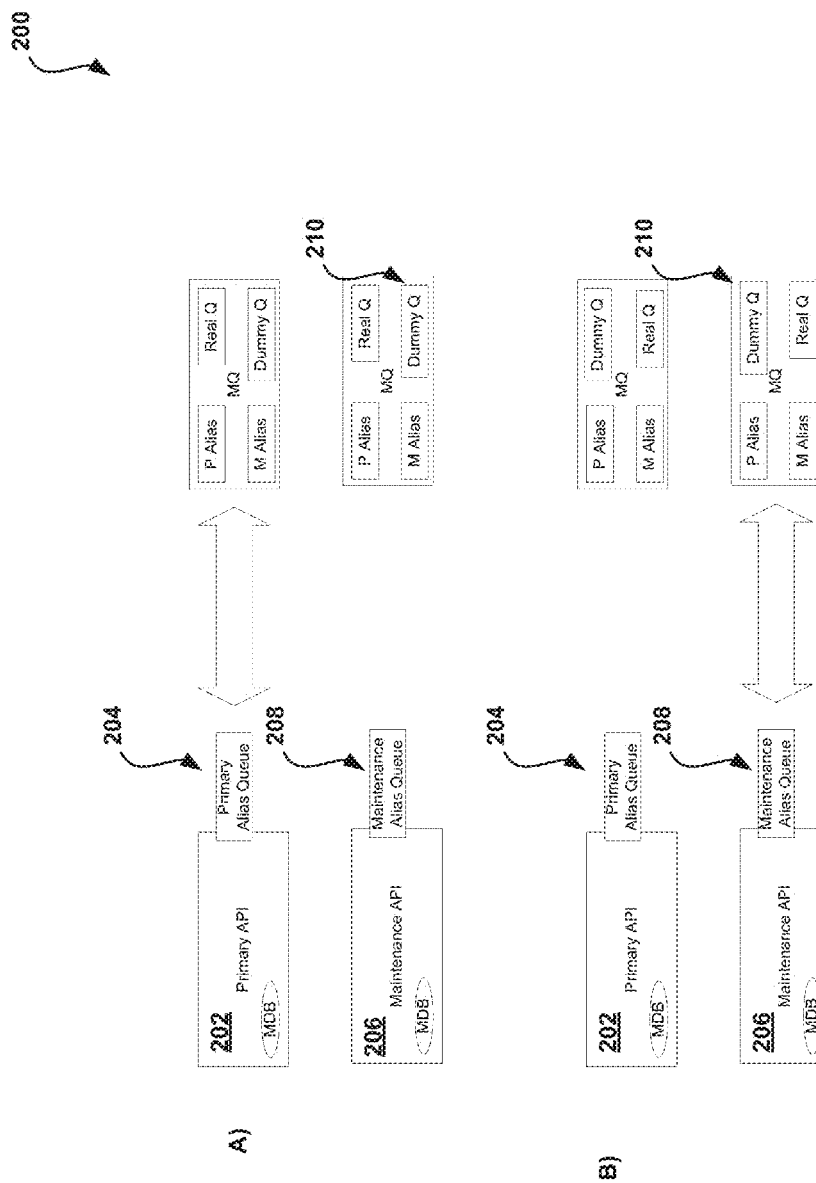
FIG. 2 illustrates a system flow for fetching data from a physical memory queue utilizing an alias queue name, in accordance with one embodiment.

FIG. 2 illustrates a system flow 200 for fetching data from a physical memory queue utilizing an alias queue name, in accordance with one embodiment. As an option, the system flow 200 may be implemented in the context of the details of FIG. 1. Of course, however, the system flow 200 may be implemented in the context of any desired environment. Further, the aforementioned definitions may equally apply to the description below.

As shown in scenario A, a primary application programming interface (API) 202 is UP with MDB (message driven bean). The primary API 202 is listening to primary alias queues 204. The primary alias queues 204 are aliases pointing to real queues.

In this example, a maintenance API 206 is brought up with MDB listening to a maintenance alias queue 208, which is pointing to dummy queues 210.

As shown in scenario B, the aliases are switched, verified and a SVRCONN channel is restarted to refresh connections at QMGR, where nothing changes at the WL. Additionally, the maintenance API 206 is activated.

The primary API 202 and the maintenance API 206 are identical application sets and each set connects to a different alias queue to get messages. The aliases are swapped from a dummy queue to a real queue as a target to fetch (GET) messages. The switch is seamless using the techniques described.

Figure 3:
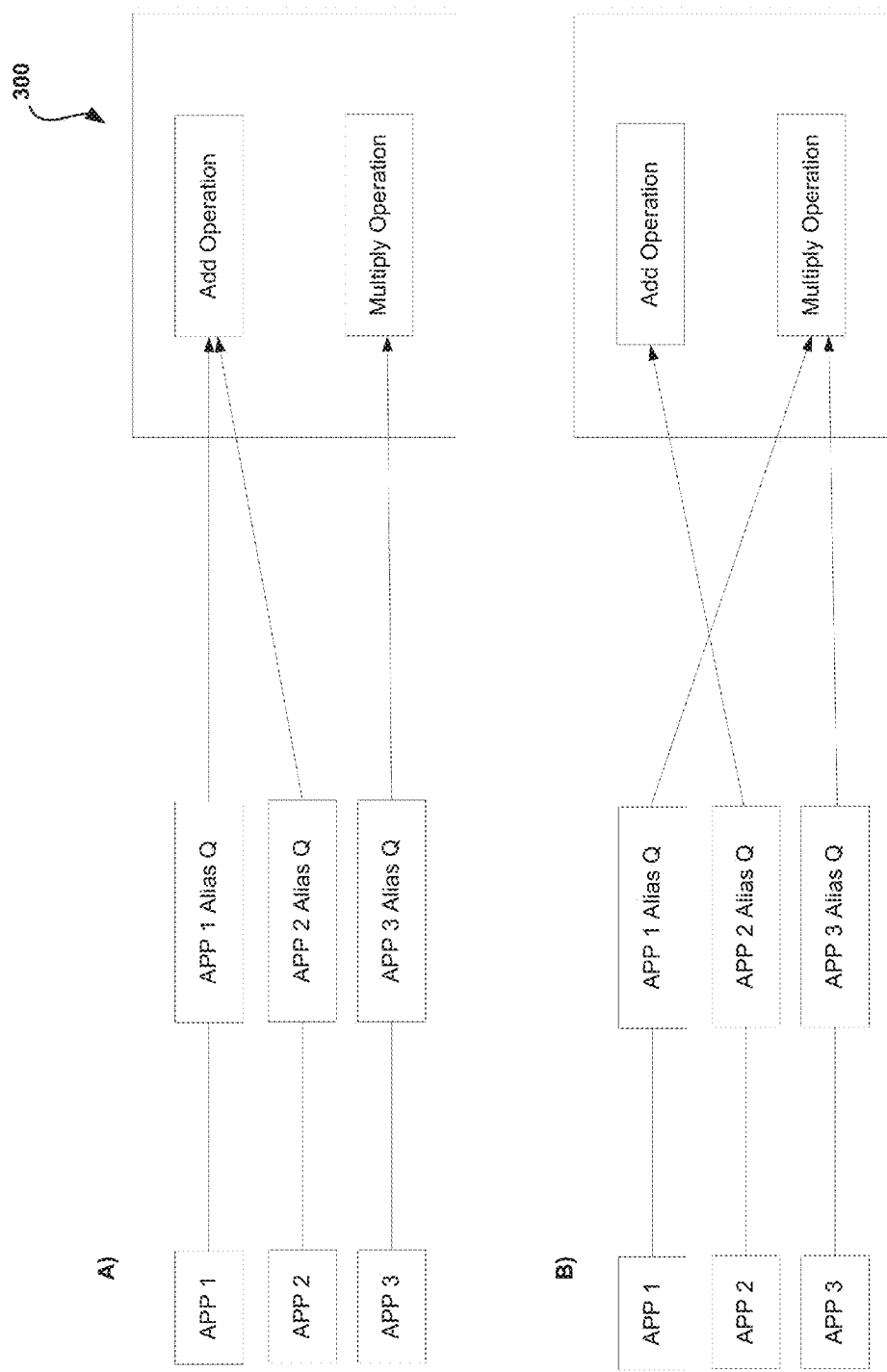
FIG. 3 illustrates system flow examples for fast on-demand switching, in accordance with one embodiment.

FIG. 3 illustrates system flow examples 300 for fast on-demand switching, in accordance with one embodiment. As an option, the system flow examples 300 may be implemented in the context of the details of the previous Figures. Of course, however, the system flow examples 300 may be implemented in the context of any desired environment. Further, the aforementioned definitions may equally apply to the description below.

Fast on-demand switching of application sets servicing a particular kind of request may be performed based on the incoming request volume. Scaling and de-scaling of an application can be done in a fraction of a second, bringing in virtues of flexibility, optimized usage of resources, and reduced cost of operation.

With reference to FIG. 3, and as an example implementation, there may be APIs that are listening to actual physical queues servicing "Add" and "Multiply" API service calls.

As shown in example A, APP 1 is currently servicing an "Add API Operation Queue" requests through logical queue "APP1 Alias Q". APP 2 is also servicing "Add API Operation Queue" requests through logical queue "APP2 Alias Q". Further, APP 3 is servicing "Multiply API Queue" requests through logical queue "APP3 Alias Q".

During the peak hours, "Multiply Operation API Queue" may be getting more requests and "Add Operation API Queue" may not be getting many requests. Thus, it may be decided to adjust to the requirement with the same resources with the options that the techniques described herein provide.

Thus, as shown in example B, the alias/logical name may be switched from where the "APP 1" is fetching messages and mapped to "Multiply Operation Queue". This takes effect by refreshing connection channels within a fraction of a second.

Accordingly, lesser application resources may be flexibly managed to adjust to fluctuating demand, or even schedule requests in batches to optimize hardware/software usage.

Figure 4:
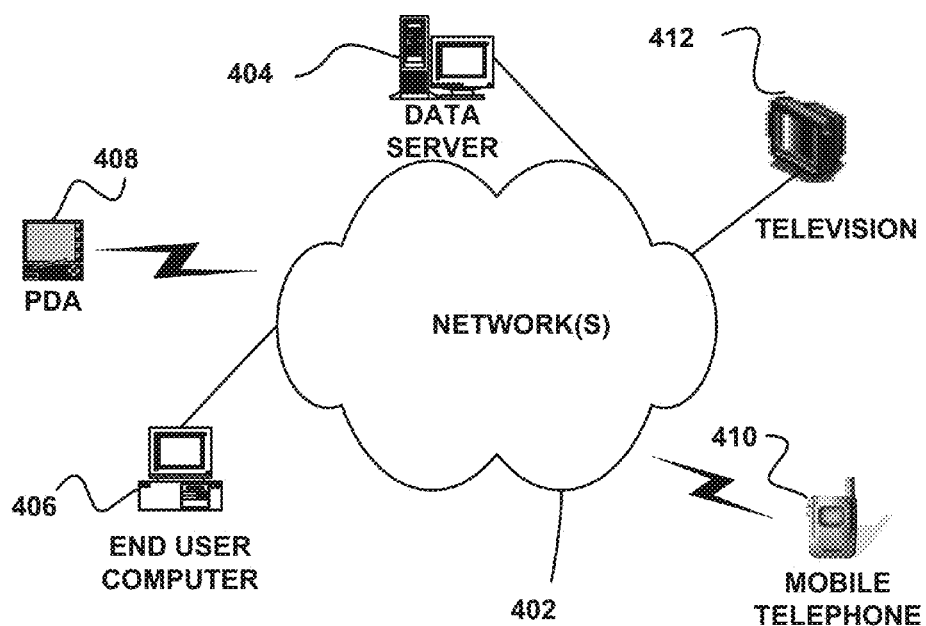
FIG. 4 illustrates a network architecture, in accordance with one possible embodiment.
Figure 4:

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, tap-top computer, and/or any other type of logic. Still yet, various other devices may be coupled to the network 402 including a personal digital assistant (PDA) device 408, a mobile phone device 410, a television 412, etc.

Figure 5:
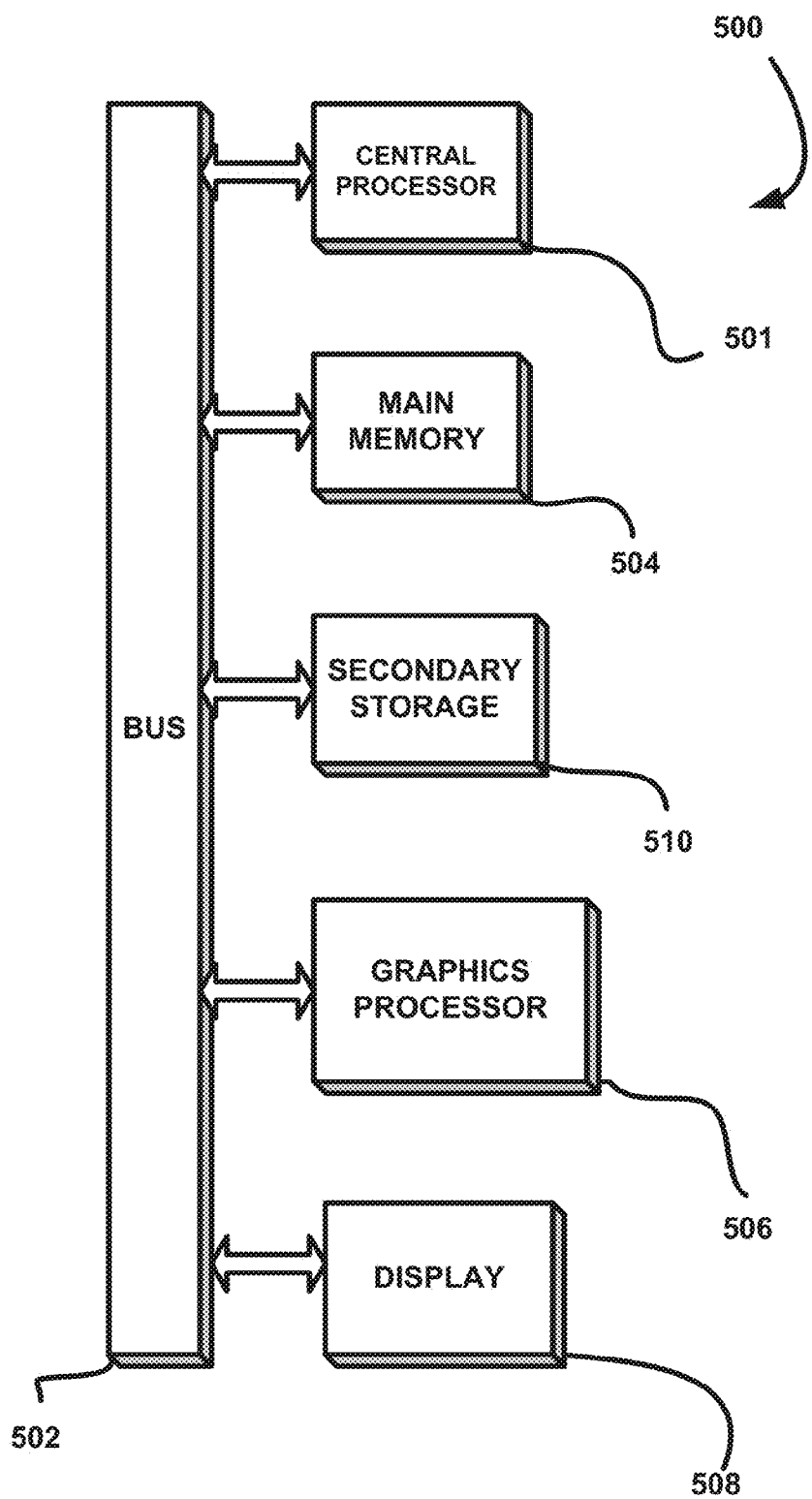
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of tangible computer-readable media.

While various embodiments have been described above, it should be understood that they have been presented by way of example only, and not limitation. Titus, the breadth and scope of a preferred embodiment should not be limited by any of the above-described exemplary embodiments, but should be defined only in accordance with the following claims and their equivalents.

What is claimed is:

1. A method, comprising:
   identifying a physical queue associated with at least a portion of memory;
   mapping a first alias queue name to the physical queue, wherein the first alias queue name is associated with a primary application programming interface (API);
   receiving an indication to utilize a maintenance application programming interface instead of the primary application programming interface; and
   fetching data utilizing the first alias queue name in response to a request to fetch the data from the physical queue.

2. The method of claim 1, wherein the maintenance application programming interface has the same functionality as the primary application programming interface.

3. The method of claim 2, further comprising mapping a second alias queue name to the physical queue.

4. The method of claim 3, wherein the second alias queue name is associated with the maintenance application programming interface.

5. The method of claim 4, further comprising mapping the first alias queue name to a dummy queue.

6. The method of claim 5, further comprising fetching additional data utilizing the second alias queue name in response to a request to fetch the additional data from the physical queue.

7. The method of claim 6, wherein fetching the additional data utilizing the second alias queue name occurs without any disruption of service of application functionality.

8. The method of claim 1, wherein the first alias queue name is associated with a first set of applications.

9. The method of claim 8, further comprising mapping a plurality of different alias queue names to the physical queue.

10. The method of claim 9, wherein each of the plurality of different alias queue names are associated with a different set of applications.

11. The method of claim 10, further comprising determining to scale up usage associated with the first set of applications.

12. The method of claim 11, further comprising determining to scale up usage associated with the first set of applications by utilizing the different set of applications.

13. The method of claim 12, further comprising fetching data from the physical queue utilizing the plurality of different alias queue names such that the different set of applications are capable of being utilized without interruption to use of first set of applications.

14. A system comprising:
   a memory system; and
   one or more processing cores coupled to the memory system and that are each configured to:
   identify a physical queue associated with at least a portion of memory;
   map a first alias queue name to the physical queue, wherein the first alias queue name is associated with a primary application programming interface (API);
   receive an indication to utilize a maintenance application programming interface instead of the primary application programming interface; and
   fetch data utilizing the first alias queue name in response to a request to fetch the data from the physical queue.

15. A computer program product embodied on a non-transitory computer readable medium, comprising:
   computer code for identifying a physical queue associated with at least a portion of memory;
   computer code for mapping a first alias queue name to the physical queue wherein the first alias queue name is associated with a primary application programming interface (API);
   computer code for receiving an indication to utilize a maintenance application programming interface instead of the primary application programming interface; and
   computer code for fetching data utilizing the first alias queue name in response to a request to fetch the data from the physical queue.

16. The computer program product of claim 15, wherein the computer program product is operable such that the first alias queue name is associated with a first set of applications.

17. The computer program product of claim 16, further comprising computer code for mapping a plurality of different alias queue names to the physical queue.

18. The computer program product of claim 17, wherein the computer program product is operable such that each of the plurality of different alias queue names are associated with a different set of applications.

* * * * *